United States Patent [19]

Larsson et al.

[11] 4,016,816
[45] Apr. 12, 1977

[54] SHELL ESPECIALLY FOR MORTARS

[75] Inventors: Bengt Håkan Larsson, Eskilstuna; Hans Erik Valdemar Karlsson, Sollentuna, both of Sweden

[73] Assignee: Forenade Fabriksverken, Eskilstuna, Sweden

[22] Filed: July 21, 1975

[21] Appl. No.: 597,687

[52] U.S. Cl. .................................... 102/67
[51] Int. Cl.² ........................... F42B 13/48
[58] Field of Search ............... 102/67, 68, 69, 64

[56] References Cited

UNITED STATES PATENTS

| 1,273,525 | 7/1918 | Murray | 102/64 |
| 3,413,923 | 12/1968 | Batou | 102/64 |
| 3,815,504 | 6/1974 | Tieben | 102/67 |
| 3,882,779 | 5/1975 | Frostig | 102/67 |

FOREIGN PATENTS OR APPLICATIONS 326,461  11/1902  France ............................ 102/67

Primary Examiner—Samuel W. Engle
Assistant Examiner—Donald P. Walsh
Attorney, Agent, or Firm—Fleit & Jacobson

[57] ABSTRACT

A shell, especially for mortars, comprising a casing consisting of an outer layer and an inner layer, an intermediate layer disposed between the outer layer and the inner layer, splinter bodies contained within the intermediate layer, and at least one annular flange projecting outwards from the inner layer, the flange having an outwardly projecting end surface abutting against the inside of the outer layer.

3 Claims, 1 Drawing Figure

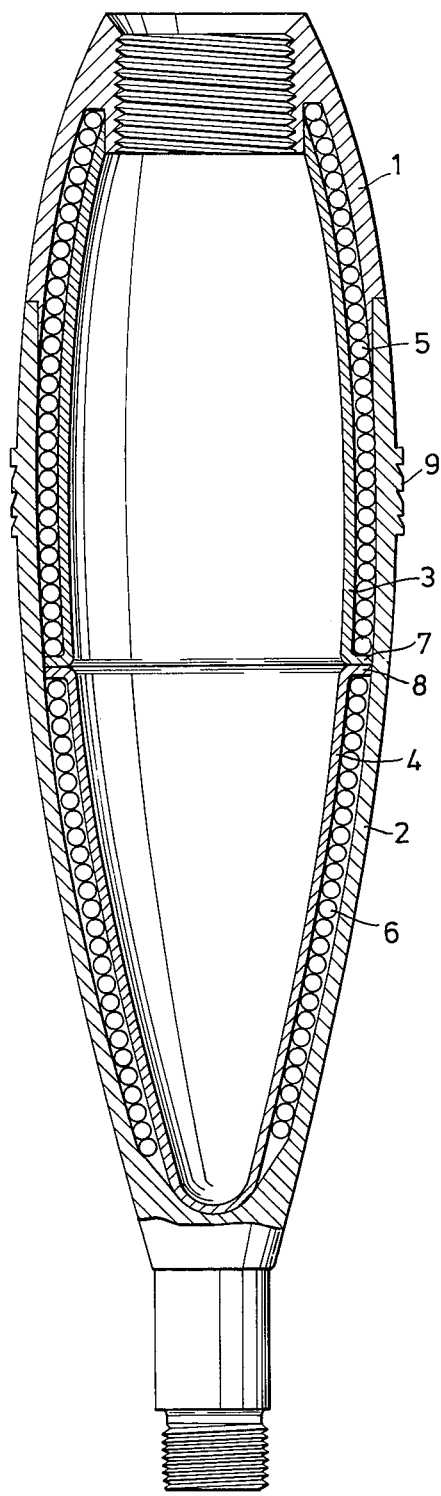

SHELL ESPECIALLY FOR MORTARS

The present invention relates to a shell, especially intended for mortars, the casing of the shell consisting of an outer layer and an inner layer with a layer therebetween comprising splinter bodies, suitably balls cast in rubber or plastic.

It is desirable from efficacy points of view to make a shell intended for a mortar with a ball layer enclosed between an outer layer and an inner layer, where the thicknesses of the layers are dimensioned with consideration taken to the strain at the discharge and also with consideration taken to the demand for optimal addition in efficacy and the demand for a longer fire range. The ball layer consists of, for instance, balls cast in rubber or plastic and comprises to a great extent the effective splinter part.

Characteristic of a several layer construction being subjected to an outer overpressure is, however, that the strain, especially the tangential strain, is greatest at the inner layer. This involves in this case a risk for denting, as the inner layer is relatively thin-walled. Denting is unsuitable because of the presence of an explosive.

It is not advisable to thicken the outer layer and/or the inner layer, as this lessens the load ratio with impaired effectiveness as a result. Moreover the shell weight is increased, whereby the initial velocity and thus the range is diminished or a larger propulsive charge is required with a larger load on the barrel as a result. This will in turn require a reinforcement of the barrel, which consequently would become heavier and more difficult to handle. Beside, a certain ratio between the thicknesses of the layers is required from efficacy points of view.

According to the invention there is provided a shell, especially for mortars, comprising a casing consisting of an outer layer and an inner layer, an intermediate layer disposed between the outer layer and the inner layer, splinter bodies contained within the intermediate layer, and at least one annular flange projecting outwards from the inner layer, the flange having an outwardly projecting end surface abutting against the inside of the outer layer.

An embodiment of the shell according to the invention will be described in more detail with reference to the accompanying drawing, wherein a longitudinal section is shown through a shell for a mortar. The fuse and the tail-fins are deleted.

The casing of the shell consists of an outer layer made in two parts 1, 2 and an inner layer made in two parts 3, 4 as well as a layer therebetween made in two parts 5, 6 comprising splinter bodies, suitably balls cast in rubber or plastic. The inner layer consists of a front part 3 and a rear part 4, the opposing ends thereof being provided with outwardly projecting flanges 7, 8, the opposing surfaces thereof being welded together. The joint may be covered with glue to eliminate possible slit effects. The flanges are located somewhat behind the site of the largest diameter of the shell casing at the grooves 9 of the shell, i.e. where the risk of denting of the inner layer is greatest.

The outwardly projecting end surfaces of the flanges are abutting directly against the inside of the outer layer. Optionally, the flanges may be abutting against the inside of the outer layer via a thin layer of elastic material. It is obvious to those skilled in the art how such a layer may be shaped and disposed, and it is therefore not shown in the drawing. The elastic material may, for instance, be shaped as an annular rubber strip having substantially the same width as the annular flange. Optionally, the inside of the outer layer may be covered by a thin layer of elastic material.

The axial strains in the inner layer near the flanges are compression stresses, which is favourable with regard to the risk of indications of fracture. The tangential strains in the inner layer are greatest somewhat behind the site of the largest diameter of the shell casing. The flanges are suitably placed, where the tangential strains are of greatest magnitude, and so they are stiffening the inner layer so that the risk of denting is eliminated.

It is also possible to make the inner layer in more than two parts or in just one part, which is provided with one or more annular, outwardly projecting flanges welded thereon.

What is claimed is:

1. A shell, especially for mortars, comprising a casing of circular cross-sectional shape having a front end and a rear end and consisting of an inner layer, an outer layer and an intermediate layer disposed between said inner and outer layers comprising a plurality of splinter bodies, circumferentially extending guide elements on the outer surface of said outer layer intermediate the ends of said casing, said inner layer and said intermediate layer extending axially behind said guide elements toward said casing rear end and at least one annular flange projecting radially outward from said inner layer through said intermediate layer and disposed at an axial location intermediate said guide elements and said casing rear end, said annular flange having an outwardly projecting, peripheral end surface in abutting engagement with the inside of said outer layer.

2. A shell as defined in claim 1 wherein said inner layer consists of a front part and a rear part having opposing ends, each of said opposing ends being provided with an outwardly projecting flange having opposing surfaces welded together in abutting engagement to form said annular flange.

3. A shell as defined in claim 2 wherein said intermediate layer comprises splinter bodies in the form of balls and a layer of bonding material such as rubber or plastic in which said bodies are embedded.

* * * * *